(12) United States Patent
Dettori et al.

(10) Patent No.: US 8,965,890 B2
(45) Date of Patent: *Feb. 24, 2015

(54) CONTEXT SENSITIVE MEDIA AND INFORMATION

(71) Applicant: International Business Machines Corporation, Armonk, NY (US)

(72) Inventors: Paolo Dettori, Hartsdale, NY (US); Julio Nogima, Sao Paulo (BR); Frank A. Schaffa, Hartsdale, NY (US); Augustine C. Schilling, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,417

(22) Filed: Aug. 28, 2013

(65) Prior Publication Data
US 2013/0346407 A1    Dec. 26, 2013

Related U.S. Application Data

(63) Continuation of application No. 11/199,653, filed on Aug. 9, 2005, now Pat. No. 8,548,963.

(51) Int. Cl.
*G06F 17/30* (2006.01)
(52) U.S. Cl.
CPC .......... *G06F 17/30386* (2013.01); *G06F 17/30* (2013.01); *G06F 17/30905* (2013.01)
USPC .... 707/736; 707/794; 707/726; 707/E17.121; 709/202; 709/203; 725/44; 725/47; 715/708
(58) Field of Classification Search
CPC ... G06Q 50/06; G06Q 20/102; G06Q 20/145; G06Q 20/40; G06Q 40/12; G06Q 10/0631; G06Q 10/1057; G06Q 30/0275; G06Q 10/1097; G06Q 20/08; G06Q 30/0621; G06Q 40/04; G06Q 40/06; G06F 17/30386; G06F 17/30905; G06F 17/30
USPC ............ 707/794, 726, E17.121, E17.12, 736, 707/E17.009; 715/708, 205, 255; 725/44, 725/47; 709/202, 203, 223, 224

See application file for complete search history.

(56) References Cited

U.S. PATENT DOCUMENTS 6,023,714 A * 2/2000 Hill et al. ........................ 715/235
6,085,184 A * 7/2000 Bertrand et al. ................ 706/45
(Continued)

OTHER PUBLICATIONS

Nathan S. Abramson and Walter R. Bender—"Context-sensitive multimedia"—Proc. SPIE 1785, Enabling Technologies for High-Bandwidth Applications, 122 (Jan. 20, 1993); doi:10.1117/12.139252—vol. 1785 (pp. 1-11: 122-132) spiedigitallibrary.org.*

(Continued)

*Primary Examiner* — Anh Ly
(74) *Attorney, Agent, or Firm* — Tutunjian & Bitetto, P.C.; Anne V. Dougherty

(57) ABSTRACT

Systems and methods for creating and processing context sensitive media objects are disclosed. One method is directed to processing a context sensitive media object in a target context. The method includes receiving an object with one or more object rules embedded within the object such that the one or more object rules are propagated with the object. Further, a determination of whether the object is context sensitive is made. If the object is context sensitive, the method prioritizes between the one or more object rules and one or more context rules related to a target context. In addition, a determination of which method or methods should be executed to process the object in the target context is made based on the prioritization.

14 Claims, 4 Drawing Sheets

(56) References Cited

U.S. PATENT DOCUMENTS

| | | | |
|---|---|---|---|
| 6,418,408 B1* | 7/2002 | Bhaskar et al. | 704/219 |
| 6,505,160 B1* | 1/2003 | Levy et al. | 725/112 |
| 6,550,057 B1* | 4/2003 | Bowman-Amuah | 717/126 |
| 6,751,673 B2* | 6/2004 | Shaw | 709/231 |
| 6,766,368 B1* | 7/2004 | Jakobson et al. | 709/224 |
| 6,848,004 B1* | 1/2005 | Chang et al. | 709/232 |
| 6,859,455 B1* | 2/2005 | Yazdani et al. | 370/392 |
| 6,907,563 B1* | 6/2005 | Kumar et al. | 715/207 |
| 6,941,557 B1* | 9/2005 | Jakobson et al. | 719/316 |
| 7,284,048 B2* | 10/2007 | Jakobson et al. | 709/224 |
| 8,161,066 B2* | 4/2012 | Spivack et al. | 707/770 |
| 8,422,733 B2* | 4/2013 | Reisman | 382/100 |
| 2002/0033844 A1* | 3/2002 | Levy et al. | 345/744 |
| 2002/0052849 A1* | 5/2002 | McCutchen et al. | 705/59 |
| 2002/0140719 A1* | 10/2002 | Amir et al. | 345/716 |
| 2002/0156767 A1* | 10/2002 | Costa et al. | 707/1 |
| 2003/0069881 A1* | 4/2003 | Huttunen | 707/5 |
| 2003/0105622 A1* | 6/2003 | Horowitz et al. | 704/9 |
| 2003/0140088 A1* | 7/2003 | Robinson et al. | 709/202 |
| 2003/0225723 A1* | 12/2003 | Agarwalla et al. | 707/1 |
| 2004/0003032 A1* | 1/2004 | Ma et al. | 709/203 |
| 2004/0045040 A1* | 3/2004 | Hayward | 725/135 |
| 2004/0060003 A1* | 3/2004 | Mani et al. | 715/513 |
| 2004/0220926 A1* | 11/2004 | Lamkin et al. | 707/3 |
| 2005/0021512 A1* | 1/2005 | Koenig | 707/3 |
| 2005/0060365 A1* | 3/2005 | Robinson et al. | 709/203 |
| 2005/0097008 A1* | 5/2005 | Ehring et al. | 705/26 |
| 2005/0182773 A1* | 8/2005 | Feinsmith | 707/100 |
| 2005/0213656 A1* | 9/2005 | Liu et al. | 375/240.01 |
| 2005/0257169 A1* | 11/2005 | Tu | 715/810 |
| 2006/0010206 A1* | 1/2006 | Apacible et al. | 709/205 |
| 2006/0015603 A1* | 1/2006 | Jakobson et al. | 709/223 |
| 2006/0020916 A1* | 1/2006 | Allison et al. | 717/114 |
| 2006/0139319 A1* | 6/2006 | Kariathungal et al. | 345/156 |
| 2006/0184983 A1* | 8/2006 | Casey | 725/89 |
| 2006/0272030 A1* | 11/2006 | Slemmer et al. | 726/27 |
| 2007/0038670 A1* | 2/2007 | Dettori et al. | 707/104.1 |
| 2007/0053513 A1* | 3/2007 | Hoffberg | 380/201 |
| 2007/0067373 A1* | 3/2007 | Higgins et al. | 707/206 |
| 2007/0150496 A1* | 6/2007 | Feinsmith | 707/100 |
| 2010/0121731 A1* | 5/2010 | Toyohara et al. | 705/26 |
| 2010/0312741 A1* | 12/2010 | Roegner | 706/47 |
| 2013/0346407 A1* | 12/2013 | Dettori et al. | 707/736 |

OTHER PUBLICATIONS

K Mayer-Patel, LA Rowe—Multimedia . . . , 1997—reviews. spiedigitallibrary.org—"Design and performance of the berkeley continuous media toolkit" (pp. 1-13:194-206).*

Gabriel Jakobson, Robert Weihmayer, and Mark Weissman—"A Domain-Oriented Expert System Shell for Telecommunication Network Alarm Correlation"—Network Management and Control; vol. 2, Part V, pp. pp 365-380. Copyright1994 DOI10.1007/978-1-4899-1298-5_32.*

Usman Y. Mobin—"Graphical metadata management for the context mediation system"—2002—interchange.mit.edu—Sloan School of Management—Jan. 28, 2002 pp. 1-88.*

* cited by examiner

CONTEXT SENSITIVE MEDIA AND INFORMATION

RELATED APPLICATION DATA

This application is a Continuation application of U.S. patent application Ser. No. 11/199,653 filed on Aug. 9, 2005, now issued as U.S. Pat. No. 8,548,963, incorporated herein by reference in its entirety.

BACKGROUND

1. Technical Field

The present invention relates to rule-based media content processing across different contexts, and in particular to providing media objects with methods and rules for interaction with target contexts.

2. Description of the Related Art

Media content has become more pervasively employed in information technology. Media content includes (but is not limited to) pictures, audio, video and associated metadata. The importance of media is directly related on how usable the content in the target environment is, that is, content should be easily searchable to locate the desired fragment, and content should be in the proper format for the target environment.

Methods for formatting and processing media content are known in the art. Existing solutions address mainly the processing of static media content in a context, and address very limited automatic transformations based on limited information on the media such as mime type or file extension. Some solutions address the specific problem of automatically adapting the format of a document to a specific viewer; other solutions address the automatic transcoding of content in a content distribution network. However, the available art does not address the general problem of making the content aware of different contexts. In known solutions, the rules to deal with different media are all hardwired into the applications, and not present in the content itself.

U.S. Pat. No. 6,023,714 entitled "Method and system for dynamically adapting the layout of a document to an output device," addresses the specific problem of automatically adapting the format of a document to a specific viewer. U.S. Pat. App. No. 2003/0225723 A1 entitled "Content transcoding in a content distribution network," addresses the automatic transcoding of content in a content distribution network, based on conditions for selecting particular associated transformations to be applied to a master content.

U.S. Pat. App. No. 2002/0052849 A1 entitled "System and methods for the production, distribution and flexible usage of electronic content in heterogeneous distributed environments," describes a system to support creation, distribution and flexible usage of electronic content, where a content creator can create and associate a sphere of fair use and content modulation rules definitions with content.

SUMMARY

What is needed is a system and method for the automatic processing of content which permits the context to be reactive to the media, so that content is readily available for use in the target context and no time-consuming manual processes need to be involved.

The present invention provides systems and methods to make media content sensitive to the context. Embodiments of the present invention employ advances in object oriented technologies and programming patterns, by extending the notion of media content from static data to a media object including data, rules and methods. Standard object oriented technology includes an object as data and methods, and an object can be manipulated by the run time environment invoking its methods. Even if the definition of object is quite abstract, an implementation of an object can work in a specific programming environment; for example a Java™ object can be used in a Java™ programming environment, and so on.

The present invention extends the notion of object oriented to the media content, but is independent from a specific programming environment. In addition, the present invention may add rules to the media object which interact with other rules in the context, so that the processing of the media is the result of a negotiation between context and object rules.

A system and method for making media content sensitive to a context, such that the media content carries information needed to automatically process the media content in a target environment includes a context processing engine. The engine processes a first set of rules and methods for media content objects and compares the first set to a second set of rules and methods for media context to decide which methods are to be applied on the media object to process the media content in a target environment.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
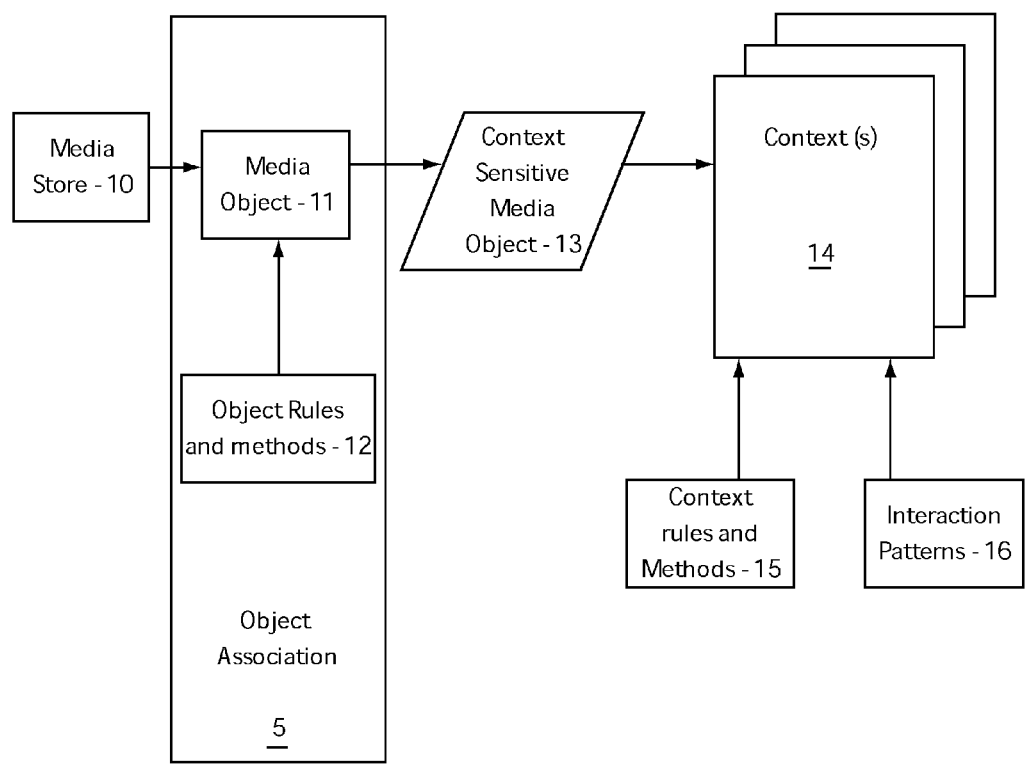
FIG. 1 schematically illustrates a context sensitive media and information system.

Embodiments of the present invention include systems and methods for making media content sensitive to context, so that when media content crosses boundaries between different contexts, the content carries information needed to automatically be processed by a target environment. Media content objects and the target environment are provided with a set of rules and methods, and patterns of interactions are provided for binding media objects and context rules. The interaction between media and context triggers specific actions such as automatic indexing of media for search, media transformations or augmentation of context (adding more metadata or media derived from current media). Other actions are also contemplated.

The interaction may also define media access control and tracking and may trigger notifications when specific processes are applied to the media content. Rules and methods may be logically embedded in the media itself, so that rules are propagated when the media object crosses different environments. In addition, rules and methods can be added or altered in each context crossed by the object, so that the appropriate interaction can take place in the next crossed context. The system/method permits the context to be reactive to the media, so that content may be readily available for use in the target context and no time-consuming manual processes need to be involved. For example, a video content imported into a new context would trigger the creation of auxiliary media such as key frames, metadata, voice transcripts, which can then be used to search and access any portion of the video or audio itself.

It should be understood that the elements shown in the FIGS. may be implemented in various forms of hardware, software or combinations thereof. Preferably, these elements may be implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention includes systems where media content is created, managed and distributed. Traditionally, media content was static and behaved the same way in every context. During its lifecycle, media content needed to be transformed and enriched with auxiliary information, and this process required manual intervention and specialized tools.

In accordance with the present invention, making media content context sensitive permits media to react to the context, and automates the processing needed to properly use the media in each context.

Referring now to the drawings in which like numerals represent the same or similar elements and initially to FIG. 1, a block/flow diagram of a system 8 for implementation of an illustrative embodiment of the present invention is shown. Media objects 11 may include objects or information created in a plurality of different ways and may be stored. Media objects 11 previously created and stored in a media store 10 are enhanced with a set of object rules and methods 12. The result is a context sensitive media object 13. An object association module 5 may be employed to associate a media content object with one or more object rules to create a context sensitive media object. Module 5 may include a computer or computer-like device, which may be programmed by a user to create context sensitive objects. Alternately, context sensitive objects may be automatically created using software programs or features of software programs to create the context sensitive object.

A context 14 is also provided with context specific rules and methods 15, and interaction patterns 16 which describe priorities and orders of execution between media object rules/methods and context rules/methods. When a context sensitive media object is imported into a context, the processing of the media object is automatically triggered.

For example, a video content object imported in a context would trigger the creation of auxiliary media such as key frames, metadata, voice transcripts, which can then be used to search and access any portion of the video or audio. In one implementation, the media object 11 can be imported in more than one context, and can be processed in one context to create new context sensitive media objects which can then be imported in other contexts. Context may refer to a programming environment, a type of device, a type of format, a hardware configuration or any other target environment where an object can be processed.

Figure 2:
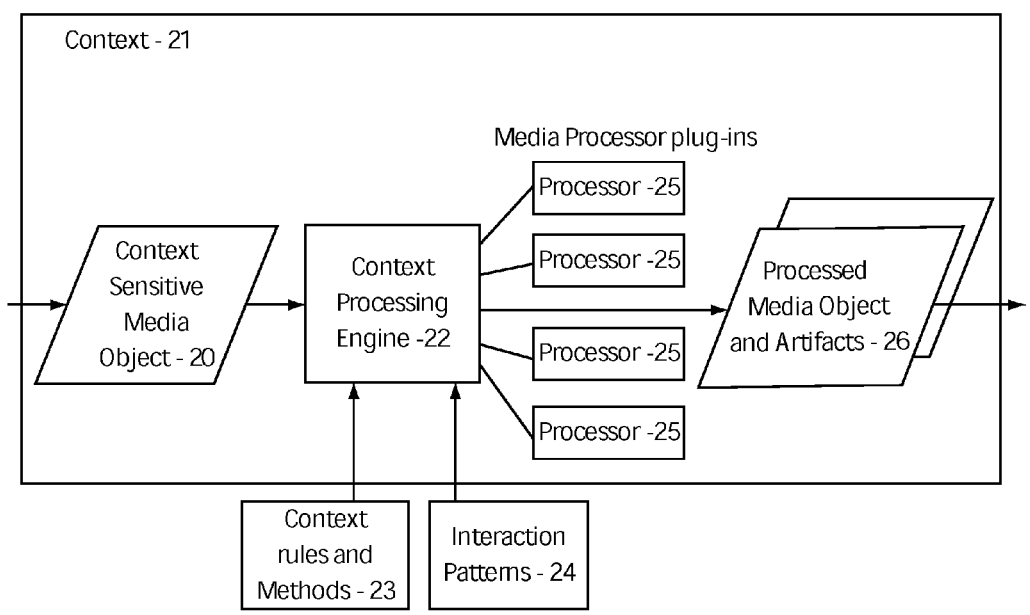
FIG. 2 describes an architecture for a context enabled system.

Referring to FIG. 2, architecture for a context enabled system 18 is illustratively shown. A context sensitive media object 20 imported into a context 21 is delivered to a context processing engine 22. A set of plug-in content processors 25 is registered with the context processing engine 22. The context processors 25 perform dedicated tasks on the media, such as transcoding or content analytics. The plug-in architecture provides an advantage for the architecture of the context processing engine 22, since it permits the content processing engine 22 to be modular and add or remove processing capability as needed. The context rules and methods 23 are provided to the context processing engine 22 at context initialization time. Context methods (23) describe methods available to the context based on the plug-in processors 25 registered with the engine 22, while context rules (23) describe context specific requirements for the media object. A context rule may, for example, state that the media object needs to be transcoded to a specific format to be used in the context.

Interaction patterns 24 are provided to the engine 22 at initialization time and are used to assign priorities and workflow on object and context rules. For example, an object rule may specify that an image object of type .GIF needs to be converted to a type .JPG as soon as imported in a context. In the same example, a context will have a rule which specifies that each imported object is to be converted to a .TIFF format; the interaction pattern 24 may then specify that the context rule on format takes priority over the object rule, and the object will not be transcoded to .JPG. Also, in the same example a workflow statement can instead be used in the interaction pattern 24 to specify that the processing needed by the object rules 23 can happen in a different temporal sequence. For example, the conversion needed by the object rule from .GIF to .JPG will take place and then the conversion needed by the engine to .TIFF will be performed.

Another example of interation patterns defining priorities would be in the case of an image object with a background color rule being overrided by a background color rule of the context. In a context associated with an impairment condition (e.g. visual or hearing) an interaction pattern could define the most appropriate way to process an object. For the visual impaired audio would have priority and for the hearing impaired video/text would have priority.

After importing the context sensitive media object 20, the processing engine 22 starts parsing the object rules, then uses its internal rules 23 and interaction patterns 24 to make decisions on the needed processing. The processing may include the use of methods embedded within the object 20 (e.g., object methods, as specified in object rules) or of methods available to the engine 22 through plug-in processors 25. The result of the processing is a new context sensitive media object 26, and additional artifacts (if specified by the rules), which are in turn new media context sensitive objects. An example is a video file with generated key frames images.

Figure 3:
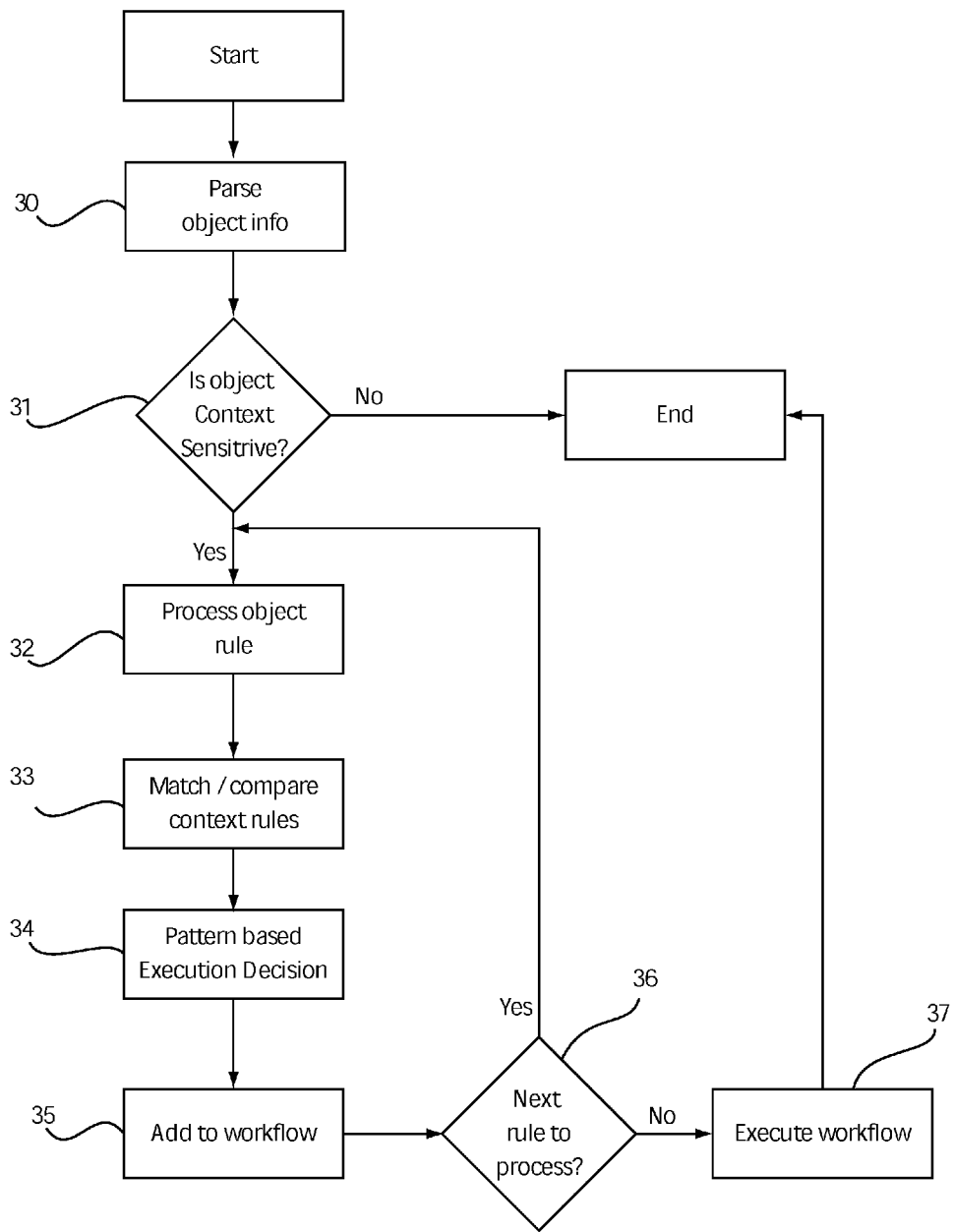
FIG. 3 shows a block/flow diagram for the processing of a context sensitive media object in a context processing engine.

Referring to FIG. 3, a block/flow diagram for processing of a context sensitive media object (20) in the context processing engine (22 of FIG. 2) is illustratively shown. The engine (22) starts parsing the media object information in block 30. A check is performed in block 31 as to whether the object includes context information. If the object does not includes content sensitive information the processing of the object stops. Otherwise, the parsing continues and processing a first media object rule is performed in block 32.

Rules may be parsed and evaluated sequentially. Each rule is then matched to existing context rules in block 33. In one implementation, context rules and interaction patterns are loaded at run time in the context engine (22). A pattern-based execution decision is then performed in block 34. This task evaluates the object rule, the matching context rule(s) and interaction pattern to decide which specific methods should be invoked for the context sensitive object.

As described above, the interaction pattern assigns priorities to object and context rules, and defines in which order processing on the media object should occur. Once decided which rules should be executed and in what order, execution decisions are added to a workflow list in block 35. If there are still object rules to be evaluated in block 36, control is assigned to block 32, where the next object rule is extracted and tasks 32 to 36 are executed again.

If all rules have been processed in block 36, control is passed to execute the workflow in block 37. The workflow engine receives the workflow list, which specifies what rules should be executed and in what order.

In one implementation, the workflow engine has the responsibility of evaluating at run time which methods are available for the execution of the rules. Methods are available at the context level by registering plug-in processors with the context engine, and some methods may be available at the media object level. An example of a media object level method is a fragment of code which can extract information embedded in the media itself.

The workflow engine executes the complete workflow 37 for the media object. The result is a new media object with context information or the original media object and a set of artifacts (see 26 in FIG. 2), which are also supplemented with context information for providing new context sensitive media objects related to the original media object.

A particularly useful implementation for the representation of media object and context rules is based on the XML markup language. In one example implementation the rules are written as a set of stanzas using the XML <rule> tag. Each rule then specifies an operation to be executed on the media object.

In the same example implementation, object methods can be also written in a set of XML stanzas using the XML <method> tag. The actual code will then be included in a child CDATA tag. The programming language for the objects methods should be based on high-level, platform independent language. In one example, the programming language could be based on Java™. In another implementation, the programming language can be based on a high level scripting language such as ECMA script. One purpose of object methods is to provide methods with knowledge on how to handle the specific media object being processed, and on how to perform specific high-level tasks which are context-specific.

Figure 4:
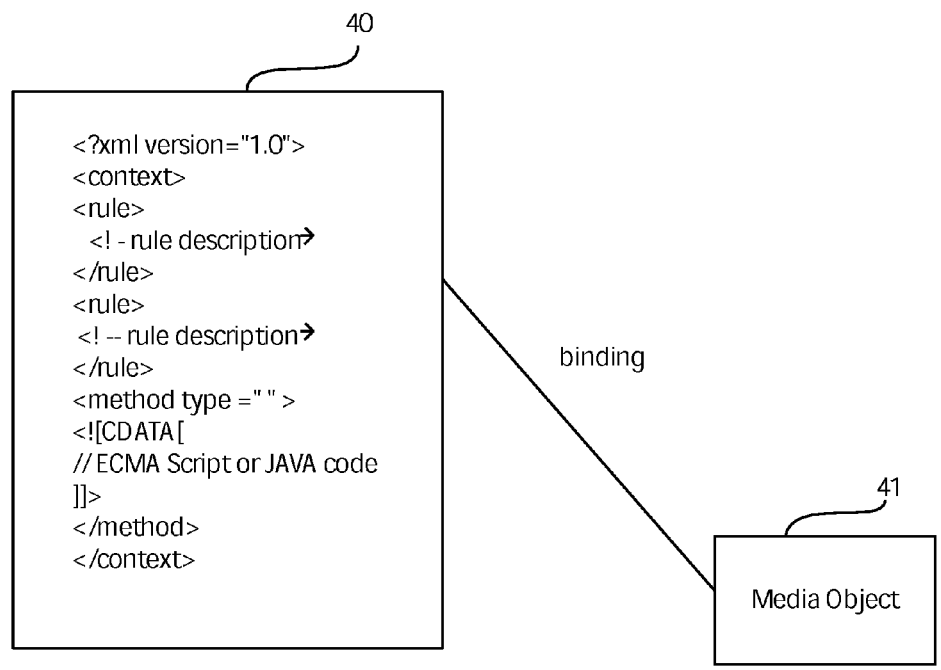
FIG. 4 shows an implementation example of context information for the object and introduces the concept of binding between the object and the information.

Referring to FIG. 4, an implementation example of context information for an object, which introduces the concept of binding between the object and the information (rules and methods), is illustratively shown. Binding between context sensitive information 40 and media object 41 can be implemented using different techniques. These techniques may be carried out, e.g., by an object association module 5 (FIG. 1). In one example implementation, the context information is pre-pended as binary information to the media object file. The context engine will then parse the header of context sensitive objects to locate object rules and methods. This method has the disadvantage that a context sensitive media object may not be usable by other systems which are non-context enabled; for example, a .GIF image with pre-pended information would not be processed properly by an image viewer application.

In another example implementation, the media object and the context sensitive information will be packaged together in a compressed archive. Many implementations of compressed archives are available, examples include: ZIP™, RAR™, JAR™, TAR™, etc.

In another example implementation the context information will be distributed through a separate logical path from the media object, but the information will have a unique reference to the media object itself, preferably in the form of a URN (Universal Resource Name) or the like. In this way, the object and its context related information may be sent down separate paths or at different times down the same path and recombined or associated at a later time.

Having described preferred embodiments of a system and method for context sensitive media and information (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for processing a context sensitive media object in a target context, comprising the steps of:
   receiving an object with one or more object rules embedded within the object such that the one or more object rules are propagated with the object;
   determining if the object is context sensitive;
   if the object is context sensitive, prioritizing between the one or more object rules and one or more context rules related to a target context using a processor; and deciding which method or methods to execute based on the prioritizing such that the object can be processed in the target context, based on interaction patterns to assign priorities and processing orders for the method or methods.

2. The method as recited in claim 1, further comprising the step of adding the method or methods to execute to a workflow of a processing engine.

3. The method as recited in claim 1, further comprising the step of binding an object with context sensitive information to create a context sensitive object.

4. The method as recited in claim 1, wherein said step of prioritizing comprises defining an order for processing the object and context rules and adding corresponding execution decisions to a workflow according to said order.

5. A non-transitory computer readable program storage device that stores a program of instructions that are readable and executable by the computer to perform the method steps as recited in claim 1.

6. A method for making a media object context sensitive for processing in a plurality of contexts, comprising the steps of:
providing a media object; and
enhancing the media object using a processor by:
embedding into the media object a first set of object rules and methods for processing media content in the media object in one or more contexts and binding context sensitive information to the media object to convert the media object into a context sensitive media object such that, upon entering one or more target environments by the context sensitive media object, the object rules are propagated with the object and the first set of object rules and a set of context rules and methods are considered to determine how to process the context sensitive media object in the one or more target environments,
wherein binding context sensitive information to the media object includes distributing the context specific information through a separate logical path from the media object and referencing the context specific information with the media object using a reference to the media object.

7. The method as recited in claim 6, wherein the step of binding includes employing an object association module.

8. The method as recited in claim 6, wherein the step of binding includes pre-pending binary information to the media object.

9. The method as recited in claim 6, wherein the step of binding includes packaging the media object and the context sensitive information together in an archive.

10. A non-transitory computer readable program storage device that stores a program of instructions that are readable and executable by the computer to perform the method steps as recited in claim 6.

11. A method for processing a context sensitive media object in a target context, comprising the steps of:
receiving an object with one or more object rules embedded within the object such that the one or more object rules are propagated with the object;
determining if the object is context sensitive;
if the object is context sensitive, prioritizing between the one or more object rules and one or more context rules related to a target context using a processor, by defining an order for processing the object and context rules and adding corresponding execution decisions to a workflow according to said order; and
deciding which method or methods to execute based on the prioritizing such that the object can be processed in the target context.

12. The method as recited in claim 11, further comprising the step of adding the method or methods to execute to a workflow of a processing engine.

13. The method as recited in claim 11, further comprising the step of binding an object with context sensitive information to create a context sensitive object.

14. A non-transitory computer readable program storage device that stores a program of instructions that are readable and executable by the computer to perform the method steps as recited in claim 11.

\* \* \* \* \*